US010637578B1

(12) United States Patent
Aydinlik et al.

(10) Patent No.: US 10,637,578 B1
(45) Date of Patent: Apr. 28, 2020

(54) ENCODING A FIRST MODULATION TYPE WITH A FIRST SPECTRAL EFFICIENCY INTO A SECOND MODULATION TYPE CAPABLE OF HAVING A SECOND SPECTRAL EFFICIENCY

(71) Applicant: Acacia Communications, Inc., Maynard, MA (US)

(72) Inventors: Mehmet Aydinlik, Acton, MA (US); Jonas Geyer, Somerville, MA (US); Christian Rasmussen, Lyngny (DK)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 16/102,376

(22) Filed: Aug. 13, 2018

Related U.S. Application Data

(60) Provisional application No. 62/546,894, filed on Aug. 17, 2017.

(51) Int. Cl.

| | |
|---|---|
| ***H04L 5/12*** | (2006.01) |
| ***H04L 27/18*** | (2006.01) |
| ***H04L 27/20*** | (2006.01) |
| ***H04L 27/36*** | (2006.01) |
| ***H04B 10/556*** | (2013.01) |
| ***H04L 1/00*** | (2006.01) |

(52) U.S. Cl.
CPC ....... *H04B 10/5561* (2013.01); *H04L 1/0042* (2013.01)

(58) Field of Classification Search
CPC .......................... H04B 10/5561; H04L 1/0042
USPC ....... 375/261, 295, 316, 279, 280, 281, 298, 375/308
See application file for complete search history.

(56) References Cited

U.S. PATENT DOCUMENTS

| | | | | |
|---|---|---|---|---|
| 5,541,955 | A * | 7/1996 | Jacobsmeyer | H03D 3/241 375/222 |
| 9,900,105 | B1 * | 2/2018 | Batshon | H04B 10/541 |
| 2009/0097582 | A1 * | 4/2009 | Barsoum | H04L 1/0003 375/262 |
| 2009/0196602 | A1 * | 8/2009 | Saunders | H04B 10/5053 398/26 |
| 2009/0323792 | A1 * | 12/2009 | Zhou | H04L 1/0003 375/224 |
| 2014/0369680 | A1 * | 12/2014 | Oveis Gharan | H04L 1/0042 398/27 |
| 2015/0071640 | A1 * | 3/2015 | Batshon | H04B 10/5161 398/91 |
| 2015/0256376 | A1 * | 9/2015 | Limberg | H04L 27/2646 375/261 |
| 2016/0337074 | A1 * | 11/2016 | Hellgren | H04L 1/0003 |
| 2017/0078116 | A1 * | 3/2017 | Al-Dweik | H04L 1/0054 |
| 2018/0234883 | A1 * | 8/2018 | Austin | H04W 28/08 |
| 2019/0190651 | A1 * | 6/2019 | Oveis Gharan | H04L 1/0042 |

* cited by examiner

*Primary Examiner* — Tesfaldet Bocure
(74) *Attorney, Agent, or Firm* — Joseph D'Angelo

(57) ABSTRACT

In a first embodiment, method and apparatus for encoding a first spectral efficiency into a second spectral efficiency; wherein the second spectral efficiency has a higher order than the first spectral efficiency. In a second embodiment, a method and apparatus for achieving at least two spectral efficiencies using a single type of modulation.

20 Claims, 8 Drawing Sheets

INFORMATION BITS 310

PRBS GENERATOR 320

QPSK MODULATOR 330

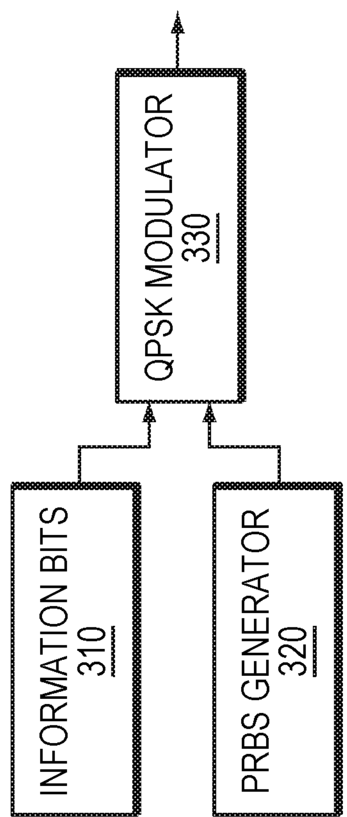
FIG. 3A
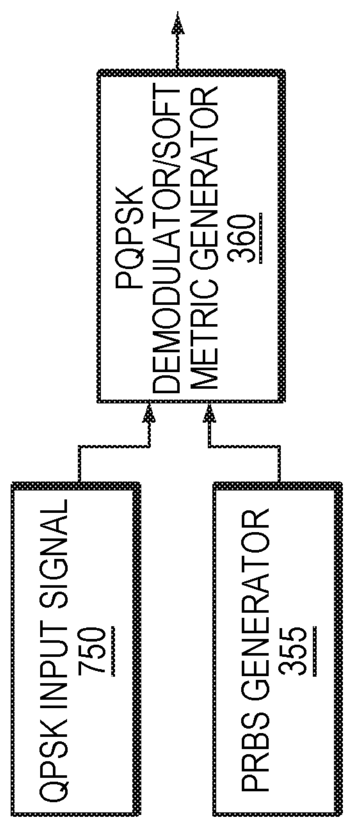
FIG. 3C
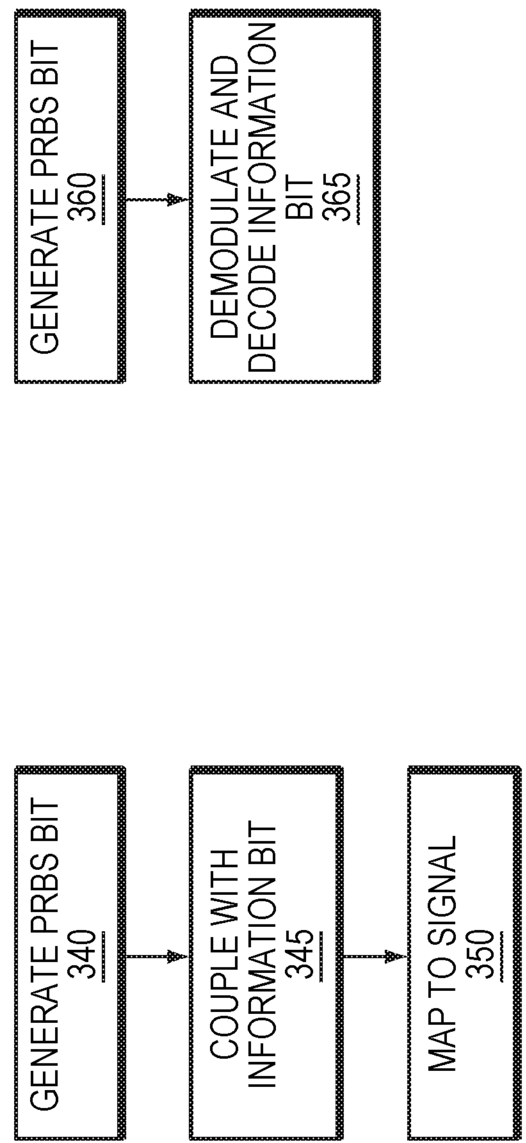
FIG. 3B
FIG. 3D

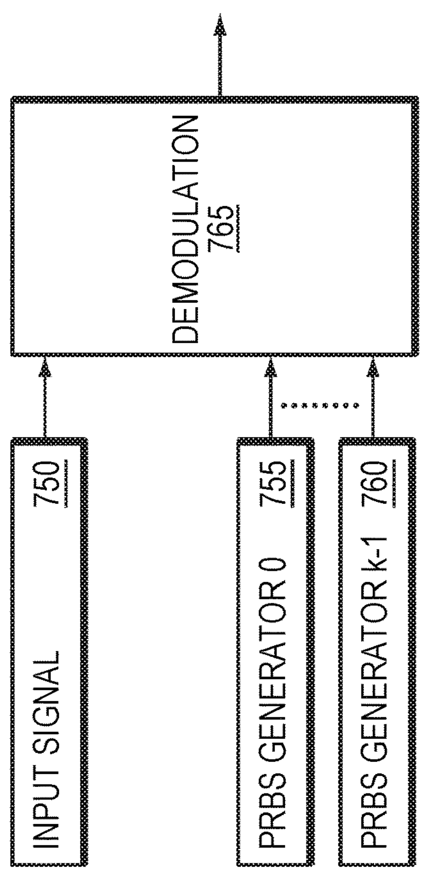
FIG. 7C
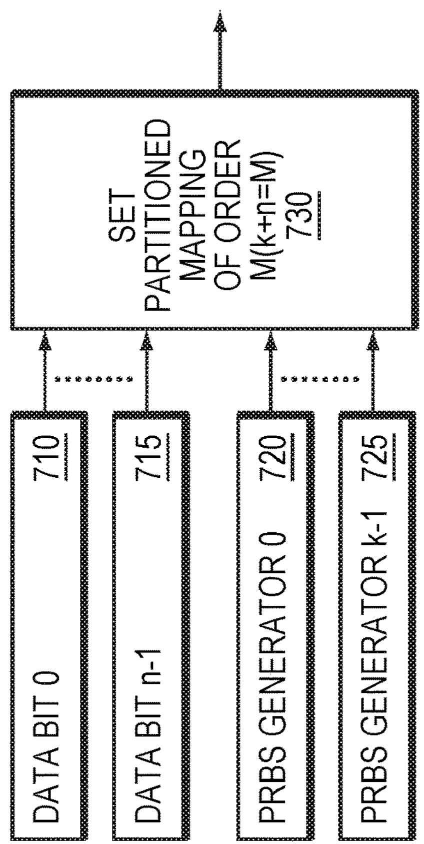
FIG. 7A
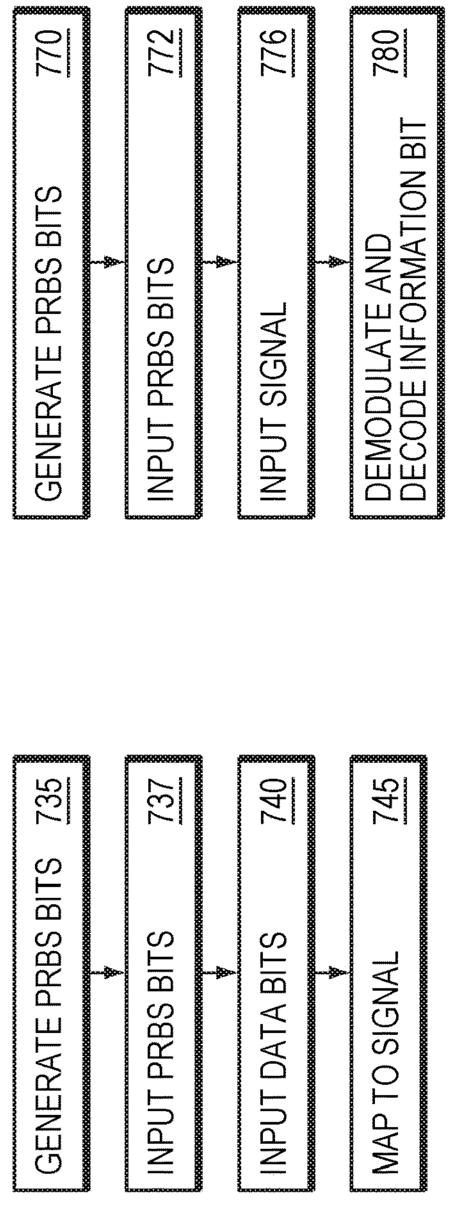
FIG. 7D
FIG. 7B

EXAMPLE EMBODIMENT OF SP-16-QAM AND P-16-QAM MODULATION

ENCODING A FIRST MODULATION TYPE WITH A FIRST SPECTRAL EFFICIENCY INTO A SECOND MODULATION TYPE CAPABLE OF HAVING A SECOND SPECTRAL EFFICIENCY

BACKGROUND

Optical transmission of information over a fiber optic cable often encodes the information on a light wave.

SUMMARY

In a first embodiment, method and apparatus for encoding a first spectral efficiency into a second spectral efficiency; wherein the second spectral efficiency has a higher order than the first spectral efficiency. In a second embodiment, a method and apparatus for achieving at least two spectral efficiencies using a single type of modulation.

BRIEF DESCRIPTION OF THE FIGURES

Various aspects and embodiments of the application will be described with reference to the following example embodiments. It should be appreciated that the figures are not necessarily drawn to scale.

FIG. 3*a* is a simplified illustration of changing of a BPSK signal in a P-QPSK signal, in accordance with an embodiment of the present disclosure;

FIG. 3*b* is a simplified method of changing a BPSK signal into a P-QPSK signal, in accordance with an embodiment of the present disclosure;

FIG. 3*c* is a simplified illustration of changing of a P-QPSK signal into a BPSK signal, in accordance with an embodiment of the present disclosure;

FIG. 3*d* is a simplified method of demodulating a P-QPSK signal into a BPSK signal, in accordance with an embodiment of the present disclosure;

FIG. 7*a* is a simplified illustration of changing of encoding a first spectral efficiency into a second spectral efficiency, in accordance with an embodiment of the present disclosure;

FIG. 7*b* is a simplified method for changing a first spectral efficiency into a second spectral efficiency, in accordance with an embodiment of the present disclosure;

FIG. 7*c* is a simplified illustration of changing a second spectral efficiency to a first spectral efficiency, in accordance with an embodiment of the present disclosure;

FIG. 7*d* is a simplified method for changing a second spectral efficiency to a first spectral efficiency, in accordance with an embodiment of the present disclosure.

SPECIFICATION

Figure 1C:
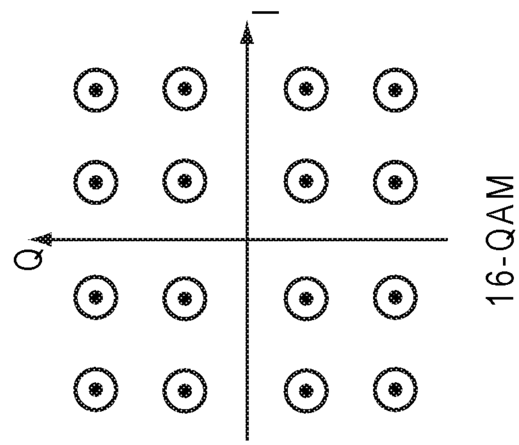
FIG. 1*c* is a simplified illustration of a 16-QAM constellation, in accordance with an embodiment of the present disclosure.

Often, a transmitter may use a modulation scheme to transmit data using a signal to a receiver. Conventional modulation schemes associate data bits with symbols. Quadrature amplitude modulation (QAM) is one example type of a typical type of modulation scheme and is commonly used in many communication systems including fiber optical and digital radio communications. Generally, the number of different symbols in a modulation format determines the order of a digital communication scheme. Conventionally, higher order modulation formats enable carrying more bits of information or parity bits per symbol. Usually, by selecting a higher order format of QAM, the data rate of a link can be increased.

Conventionally, a QAM scheme may be associated with a constellation diagram having M points arranged in a two-dimensional plane. Usually, the M points represent the M possible symbols to which data bits may be mapped, where M is an integer. For example, an 8QAM scheme may be associated with a constellation diagram having 8 points arranged in a two-dimensional plane representing 8 possible symbols to which data bits may be mapped. As another example, in conventional 16QAM, data bits are mapped to 16 different symbols. Generally, each particular one of the M points may be associated with a label indicating the bit sequence mapped to the symbol represented by the particular one point. For example, a particular one of the 8 points in a constellation diagram for 8 QAM may be associated with a label (e.g., "010") indicating that data bits "010" are mapped to the symbol represented by the particular one point. Conventional examples of QAM schemes include 8QAM, 16QAM, 32QAM, 64QAM, and 256QAM schemes.

Typically, high order optical quadrature amplitude modulation "QAM" schemes are commonly utilized in fiber optical networks to handle increasing traffic. Generally, because the QAM signal order is limited by transmission length, it is important that the optical transmitters and receivers (transceivers) can be configured to operate with several QAM signal orders to support trade-offs of transmission distance and capacity. Typically, QAM signal order also affects the spectral efficiency of the system. Usually, a higher order may mean higher spectral efficiency because more data can be transmitted with each channel use while occupying the same amount of spectral width. Conventionally, the greater the distance the harder it is to support a higher QAM signal due to interference with the signal.

Conventionally, optical transmitters and receivers employ automatic controllers to stabilize e.g. modulator bias voltages, driver signal amplitudes and received signal amplitudes at the desired operating points. Usually, most of the control algorithms require data on I and Q channels to be uncorrelated and of equal power. Generally, I and Q channels carry uncorrelated data for most modulation formats like QPSK and 16-QAM. Typically, BPSK can be an exception where all the signal power may be aligned to the I-component only, leaving no power on the Q-component.

In many embodiments, modulation formats based on higher order modulation may be modified to operate at lower spectral efficiencies. In certain embodiments, spectral efficiency of BPSK may be achieved with a signal that looks like QPSK to the optical transmitter and receiver. In certain embodiments, a BPSK signal that appears as QPSK signal may enable an automatic control algorithm designed for higher order QAM modulation formats to be used on the BPSK signal encoded as the QPSK signal. In some embodiments, use of a modulation format where a BPSK signal appears as a QPSK signal may enable the use of receiver algorithms that are designed for QPSK such as CMA equalizers. In other embodiments, higher modulation formats may also be used to transmit data for lower modulation formats or lower spectral efficiencies, providing the lower modulation format.

In many embodiments, using higher modulation formats to transmit data at spectral efficiencies of lower modulation formats may enable transition of spectral efficiencies or the information rate without changing a modulation format. In a particular embodiment, QPSK may be used to transmit the information with 1 bit/symbol as in BPSK. In most embodiments, modulation of order N may be used to achieve spectral efficiencies less than N using this scheme. In certain embodiments herein, this may be called Pseudo-M-QAM (P-M-QAM) where M=2^N.

In most embodiments, Pseudo-M-QAM schemes may be useful for transition of spectral efficiencies without changing the modulation format. In an embodiment, a transceiver may be initially configured for 64-QAM operation. In this embodiment, during operation the distance and fiber characteristics may change due to dynamic channel reconfiguration, which may require the transceiver to change the spectral efficiency. In certain embodiments, one way to change a spectral efficiency may be to modify the modulation order. In some embodiments, modifying the modulation order may disrupt automatic control loops causing glitches on the transmission. In many embodiments, a better transition with little or no impact of a transition between modulation modes to a different spectral efficient may be achieved using P-M-QAM modulation.

In still other embodiments, analog control loops at the receive side may benefit from circularly symmetric constellations, like automatic gain control (AGC) in the receiver. In certain embodiments, if a constellation is asymmetric, as in the case of BPSK, then special coupling between an I and Q channel may need to be taken into account in order to ensure proper AGC functionality even at very low frequency offset between the carrier and the local oscillator, which may result in a slowly rotating constellation at the receiver.

In some embodiments, constant modulus algorithm (CMA) may be used at a receive side in communication systems for equalization of various impairments including inter symbol interference and polarization mode dispersion (PMD). In many embodiments, CMA may fail to converge with BPSK because a pre-requisite of CMA may not be satisfied. In certain embodiments, CMA may require a constellation to be circularly symmetric, i.e. $E(a^2)=0$, while for BPSK $E(a^2)=1$. In some embodiments, various algorithms may be used for the equalization of BPSK signals, however many of these algorithms include extra operations that require more power and area on the ASIC, and increase the design and verification time.

In certain embodiments, it may be beneficial to encode a BPSK type signal onto a signal with higher spectral efficiency to make enable use of CMA to correct for various impairments. In many embodiments, it may be beneficial to encode a spectral efficiency that is not circularly symmetric into a spectral efficiency that is circularly symmetric. In many embodiments, one or more of the techniques described herein may be used to achieve different spectral efficiencies using a single type of modulation. In a particular embodiment, it may be possible to use 16 QAM modulation to achieve spectral efficiencies between 1 and 4 bits/symbol. In many embodiments, this may be achieved using a set partitioned mapping. In most embodiments, PRBS as used herein may stand for pseudo random bits. In many embodiments herein, a PRBS generator may refer to a pseudo random bit generator.

In some embodiments, in P-M-QAM modulation k PRBS bits may be generated for each group of n data bits where M=2^(k+n). In certain embodiments, spectral efficiency may be n bits/symbol. In many embodiments, PRBS bits may be used to select a subset in the set partitioned mapping. In some embodiments, data bits may be used to select one of the constellation points inside the set. In certain embodiments, selection may allow maximum Euclidian distance between the symbols for a given set of PRBS bits. In certain embodiments, to achieve two bits/symbol with 16QAM modulation, it may be possible to generate two PRBS bits and couple them with a group of two data bits. In some embodiments, data bits may be used to select one of the constellation points in the subset. In certain embodiments, the PRBS bits are 00 then the left most subset may be selected. In some embodiments, two data bits may select one of the constellation points in the subset. In most embodiments, by using known information for a portion of the encoded bits in a QAM modulation scheme, the distance between constellation points may be increased which may make it easier to determine what data was encoded at a transmitter.

In some embodiments, a bit generator may be used to insert extra information into a transmission to encode a lower order type signal into a higher order type signal. In most embodiments a transmitter and receiver may have the same type of bit generator so the receiver may decode the additional information out of a signal. In some embodiments herein, a bit generator may be referred to as a PRBS generator. In most embodiments, PRBS may refer to a pseudo random bit sequence.

In certain embodiments, a transmitter and a receiver may synchronize bits generated by a bit generator at the receiver and a bit generator at a transmitter. In some embodiments, one or more alignment words may be used to synchronize a bit generator at a transmitter and a bit generator at a receiver. In most embodiments, an alignment word is a set of bits or patterns that both an encoder and a decoder know. In many embodiments, an alignment word may be referred to herein as a frame alignment word.

In some embodiments, various methods may be used to achieve demodulation for P-QPSK symbols. In a particular embodiment, the following may be applied:

rotate P-QPSK symbols +45 degree if PRBS bit is 0 to end up on I-component axis rotate P-QPSK symbols −45 degree if PRBS bit is 1 to end up on I-component axis In certain embodiments, applying at least some of the methods herein may generate a regular BPSK symbol. In many embodiments, methods designed to demodulate or generate soft metric for BPSK symbols may be utilized.

Figure 1B:
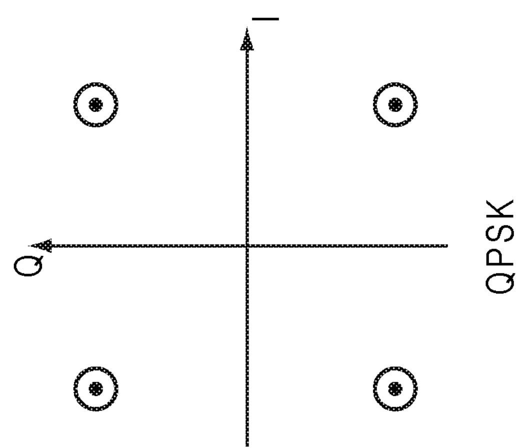
FIG. 1*b* is a simplified illustration of a QPSK constellation, in accordance with an embodiment of the present disclosure.
Figure 1A:
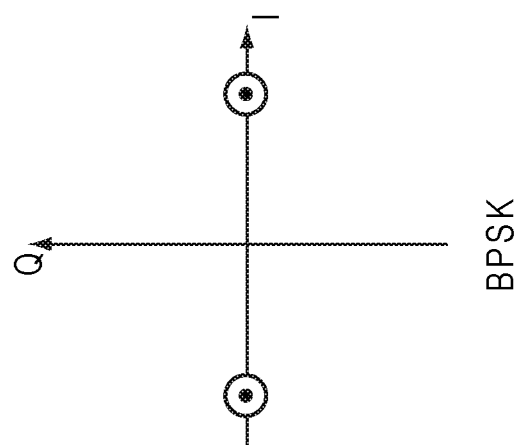
FIG. 1*a* is a simplified illustration of a BPSK constellation, in accordance with an embodiment of the present disclosure.

Refer now to the example embodiment of FIGS. 1*a*, 1*b*, and 1*c*. FIGS. 1*a*, 1*b*, and 1*c* show examples embodiments of QAM constellations, according to aspects of the current disclosure. In the example embodiment of FIG. 1*a*, QAM signal order, or number of points in the constellation, is two for BPSK (binary phase shift keying). In the example embodiment of FIG. 1*b*, signal order, or number of points in the constellation, is four for QPSK (quadrature phase shift keying). In the example embodiment of FIG. 1*b*, signal order, or number of points in the constellation, is 16 for 16-QAM (16-quadrature amplitude modulation). In the example embodiment of FIGS. 1*a*, 1*b*, and 1*c*, the number of bits transmitted per symbol is one, two and four for BPSK, QPSK and 16-QAM respectively. In these example embodiments, the QAM signal can be generated as a superposition of two real-valued signals, called Inphase (I) and Quadrature (Q) component. As well, as used herein, the constellations, such as those of FIG. 1, may also be called a modulation type.

Figures 2A, 2B, 2C, 2D:
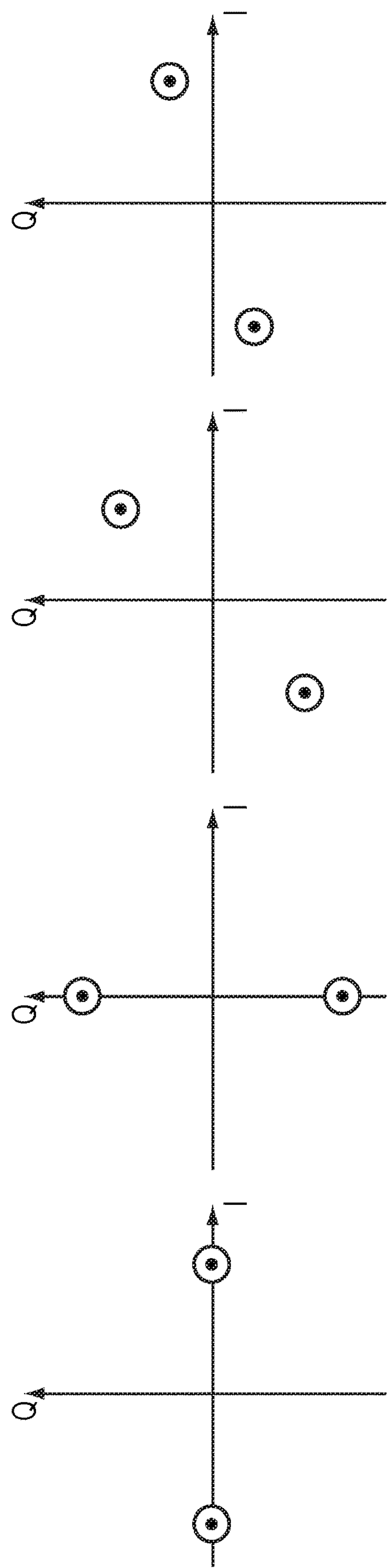
FIG. 2*a* is a simplified illustration of a BPSK constellation with power on the I component and no power on the Q component, in accordance with an embodiment of the present disclosure.
FIG. 2*b* is a simplified illustration of a BPSK constellation with power on the Q component and no power on the I component, in accordance with an embodiment of the present disclosure.
FIG. 2*c* is a simplified illustration of a BPSK constellation with equal power on the I component and Q component, in accordance with an embodiment of the present disclosure.
FIG. 2*d* is a simplified illustration of a BPSK constellation with power distributed unequally between the I component and Q component, in accordance with an embodiment of the present disclosure.

Refer now to the example embodiments of FIGS. 2*a*, 2*b*, and 2*c*, which illustrate BPSK constellations in different orientations. In the example embodiment of FIG. 2*a*, all power is on the I-component, with no power on the Q-component. In the example embodiment of FIG. 2*b*, all power is on the Q-component, with no power on the I-component. In the example embodiment of FIG. 2*c* power is equal on I- and Q-component, but both components are maximally correlated. In the example embodiment of FIG. 2*d*, this represents a case in between that of FIG. 2*a* and FIG. 2*c*.

In many embodiments, the ratio of signal power in the I-component versus signal power in the Q-component may depend on the orientation of the constellation points in the case of BPSK modulation. In most embodiments, this may be called a circularly asymmetric constellation. For example, in the example embodiments of FIGS. 1*b* and 1*c* the QPSK and 16-QAM constellations are circularly symmetric constellations. In these particular embodiments, the average signal power on the I-component is always equal to the power on the Q-component for arbitrary angles of rotation of those constellations.

In some embodiments, correlated data (as in the example embodiments in FIG. 2*c* or in FIG. 2*d*) may be addressed by employing BPSK-specific optical components—these do not support other QAM signal orders. In other embodiments, this may be addressed by designing special multi-format control schemes that increase hardware complexity and often result in inferior performance.

Refer now to the example embodiments of FIGS. 3*a* and 3*b*, which illustrates modulation of sample P-QPSK symbols. In the example embodiment of FIG. 3*a*, pseudo random bits generated by PRBS generator 320 (step 340) are coupled with information bits 310 (step 345). Each information bit of information bits 310 and a corresponding coupled bit from PRBS generator 320 are mapped to QPSK symbols by QPSK modulator 330 (step 350).

Refer now to the example embodiments of FIGS. 3*c* and 3*d*, which illustrate demodulation of sample P-QPSK symbols. PRBS generator 355 generates a bit, which for received time period, matches a bit generated at a transmitter (step 360). QPSK demodulator demodulates received QPSK signal 355 and removes a non-information bit generated by PRBS generator 355 to produce an output information bit as encoded at a transmitter (step 365).

In a particular embodiment of the example embodiments of FIGS. 3*a*, 3*b*, 3*c*, and 3*d* PRBS generator 320 at a transmitter may generate the same bits as PRBS generator 355 at a receiver. In the particular embodiment, the PRBS generators at the transmitter and receiver may be synchronized. In this particular embodiment, alignment word (AW) may be utilized for frame synchronization purposes (i.e. synchronization). In many embodiments, by looking at a transmission from an encoder to a decoder, a AW may enable a decoder to know when a PRBS generator has started generating additional bits. In the example embodiments of FIGS. 3*a*, 3*b*, 3*c*, and 3*d*, these AWs may also be used here to synchronize the PRBS generators. In many embodiments, PRBS generators may be initialized to a same state at both a transmitter and a receiver after a AW to achieve synchronization.

Figure 4:
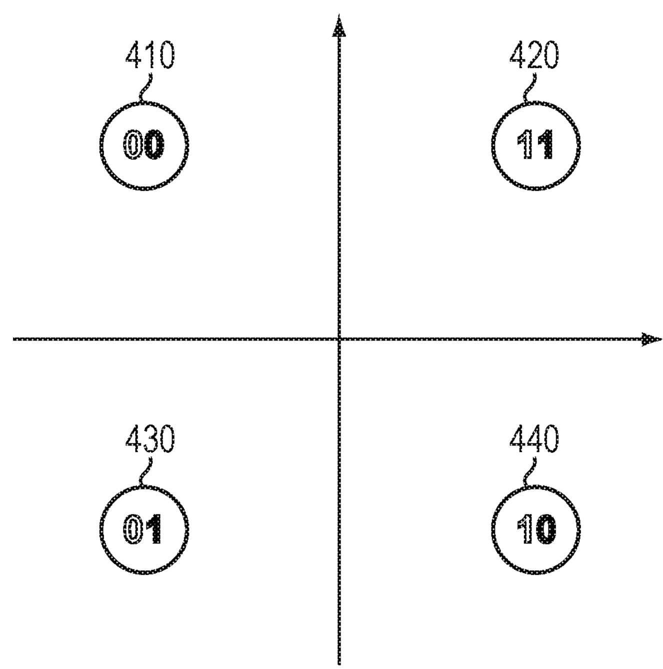
FIG. 4 is a simplified illustration of a constellation that has a BPSK signal encoded onto a QPSK constellation, in accordance with an embodiment of the present disclosure.

Refer now to the example embodiment of FIG. 4, which illustrates a constellation encoding BPSK into QPSK. In the example embodiment of FIG. 4, the first bit represents PRBS data and the second bit represents data bits. In the example embodiment of FIG. 4, the Euclidian distance is maximum between two symbols for a given PRBS bit. In the example embodiment of FIG. 4, this is due to using set partitioned mapping. In the example embodiment of FIG. 4, Gray mapping may not allow for this, causing inferior performance. Typically, Gray mapping is commonly used with regular QPSK modulation. In most embodiments, the current disclosure realizes that, such as in the example embodiments of FIGS. 3*a*, 3*b*, 3*c*, and 3*d*, Gray mapping may be a bad choice for this scheme. In most embodiments, adjacent symbols may differ by only one bit in Gray mapping. In many embodiments, this may mean that a symbol error introduced in channel causes only 1 bit of error at the demodulator. This is preferred in certain embodiments. In other embodiments, a goal may be to achieve maximum Euclidian distance on the constellation points that share the same PRBS bits. In embodiments where it is desired to maximize Euclidian distance between the constellation points that share the same PRBS bits, set partitioned mapping may be used. In the example embodiments of FIGS. 3*a*, 3*b*, 3*c*, and 3*d*, a set partitioned mapping may be set as given.

Figure 5:
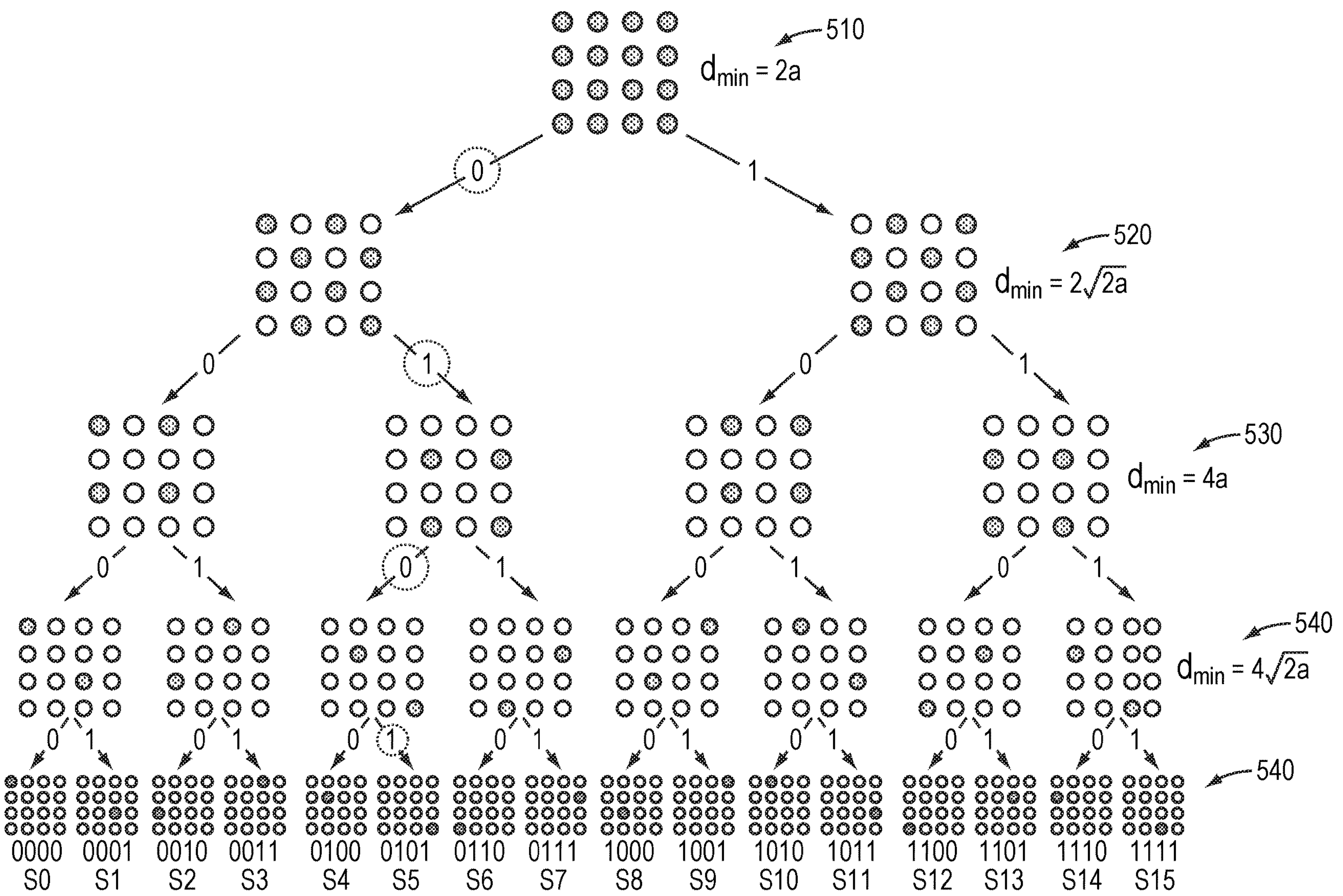
FIG. 5 is a simplified illustration of a set partitioned mapping for 16 QAM, in accordance with an embodiment of the present disclosure.

Refer now to the embodiment of FIG. 5, which illustrates a set partitioned mapping for 16 QAM, according to an aspect of the current disclosure. As shown in the example embodiment of FIG. 5, a set partitioning divides a signal set successively into smaller subsets with maximally increasing smallest intra-set Euclidian distances denoted by $d_{min}$ in FIG. 5. In the example embodiment of FIG. 5, each partition is two-way. In the example embodiment of FIG. 5, the partition is repeated 4 times in the figure. In the example embodiment of FIG. 5, the finally obtained subset are labelled S0,S1, . . . S15. In the example embodiment of FIG. 5, the labeling of the branches indicates the position of the subset. In the example embodiment of FIG. 5, this labeling also shows how to map bits to symbols. In the example embodiment of FIG. 5, for example, data bits 0101 is denoted by circles in the figure is mapped to constellation point labelled with subset S5.

Figure 6:
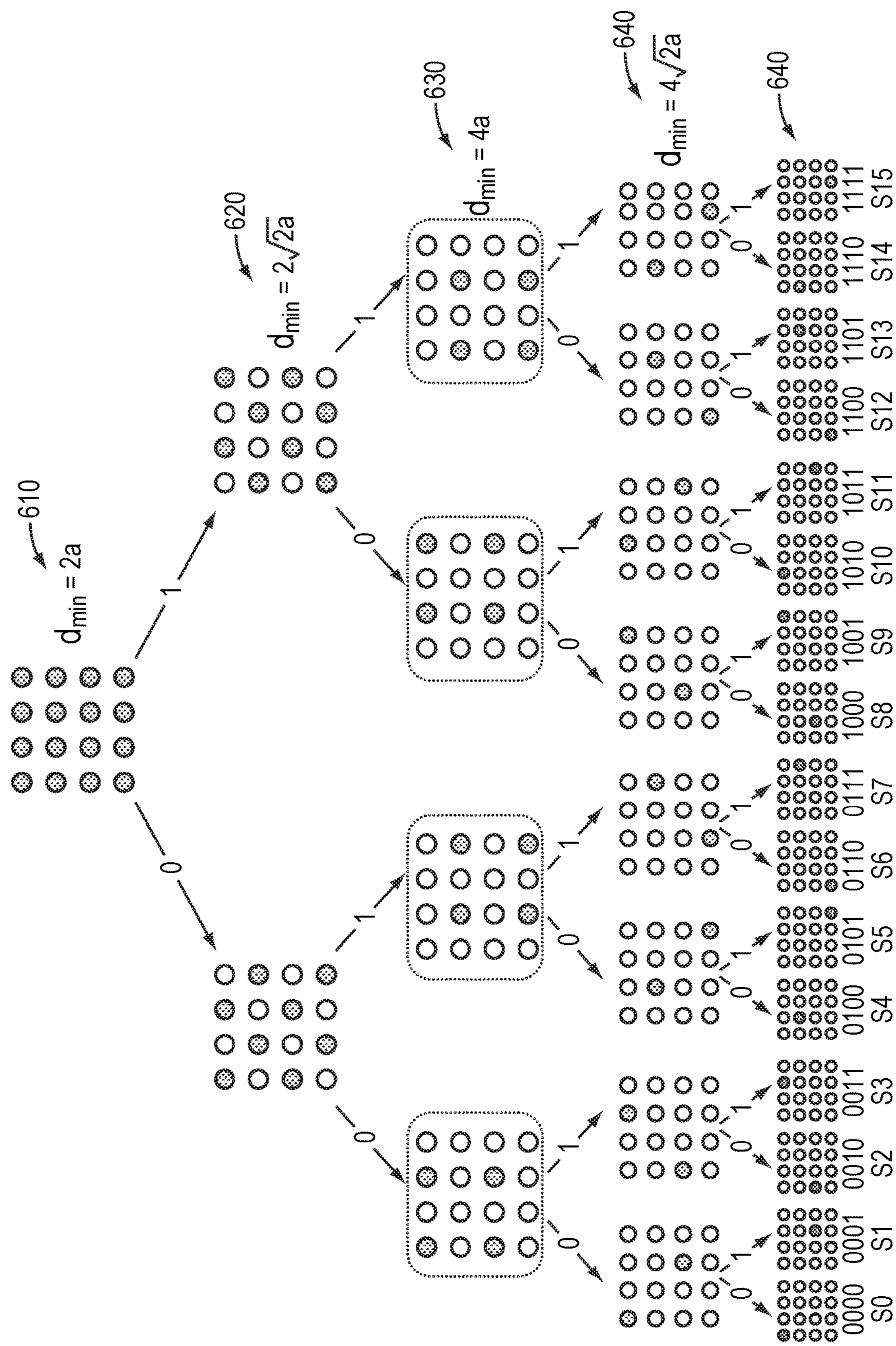
FIG. 6 is an alternative simplified illustration of a set partitioned mapping for 16 QAM, in accordance with an embodiment of the present disclosure.

For example, refer to the example embodiment of FIG. 6. In the example embodiments of FIG. 6, two PRBS bits may be used to select one of the sub sets denoted by the circles in the FIG. 6. In FIG. 6, once the known PRBS bits are encoded out of the constellation, it is easier to decode the remaining information as the minimum distance, $d_{min}$ has increase through the use of the known encoded bits from the PRBS generator. In the example embodiment of FIG. 6, as the distance becomes greater, it becomes easier to select the correct bit encoding.

FIGS. 7*a*, 7*b*, 7*c*, and 7*d* are example embodiments of the modulation and demodulation for a pseudo modulation method, according to an embodiments of the current disclosure. Refer now to the example embodiments of FIGS. 7*a* and 7*b*, which illustrate modulation of sample P-QAM symbols. In the example embodiment of 7*a*, data bits 0 710-data bits n−1 715 are inputted into set partitioned mapping of order 730 (step 740). Pseudo random bits are generated by PRBS generator 0 720 to PRBS generator k−1 725 (step 735) and inputted into set partitioned mapping of order 730 (step 740). Information bits are combined with PRBS generated bits by set partitioned mapping of order 730 and mapped to a signal (Step 745). In the example embodiment of FIG. 7*a*, PRBS generator 0 720 to PRBS generator k−1 725 represent the number of PRBS random generators to needed to generate random bits to increase the spectral efficiency of the QAM signal.

Refer now to the example embodiments of FIGS. 7*c* and 7*d*, which illustrate demodulation of sample P-QPSK symbols. PRBS generator 755 to PRBS generator k−1 760 generates PRBS bits (step 770), which for received time period, matches a bit generated at a transmitter. Demodulator 765 receives inputted PRBS generator 755 to PRBS generator k−1 760 PRBS Bits and receives input signal 750 (steps 772 and step 776). Demodulator 765 demodulates input signal 750 and uses PRBS bits to decode information bits from demodulated input signal 750 (step 780). In the example embodiment of FIG. 7*a*, PRBS generator 755 to PRBS generator k−1 760 represent the number of PRBS random generators to needed to generate random bits to match the random bits generated at a receiver to increase the spectral efficiency of the QAM signal.

Figure 8:
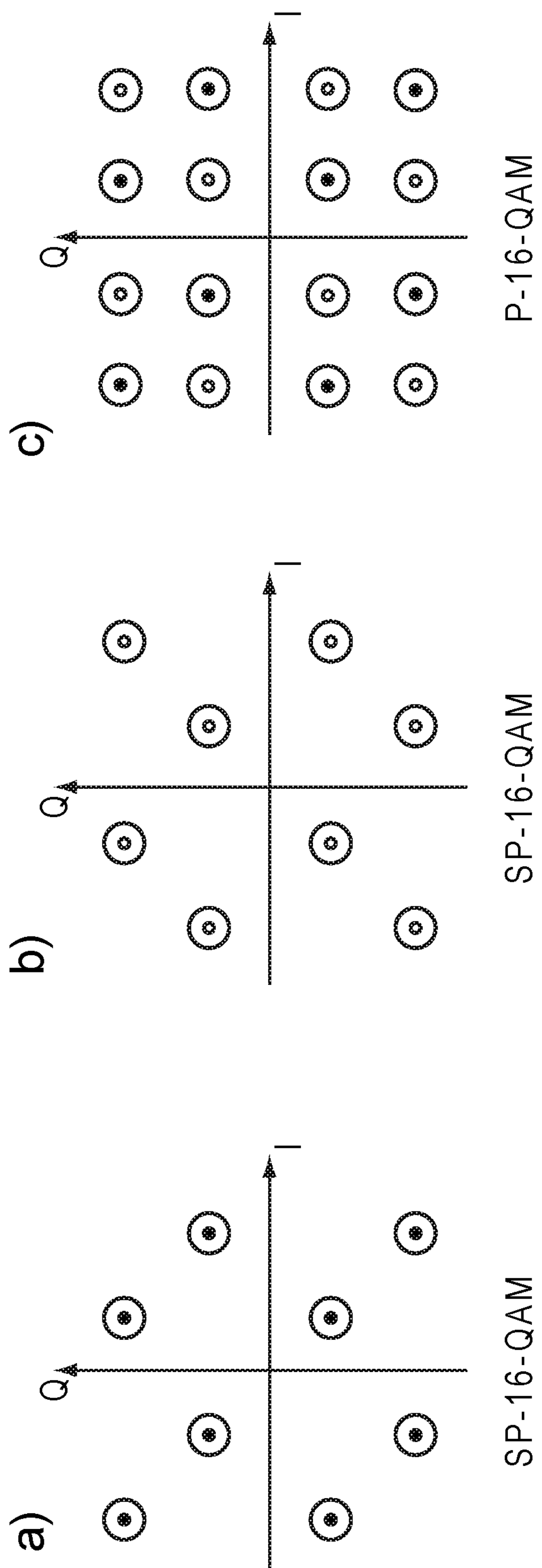
FIG. 8 is a simplified illustration of a geometrically shaped 32-QAM modulation format, in accordance with an embodiment of the present disclosure.

Consider the further example embodiments of FIGS. 8*a*, 8*b*, and 8*c*. In the example embodiments of FIG. 8*a* and FIG. 8*b*, the constellations are not circularly symmetric. FIG. 8*a* represents data encoded in half of a 16-QAM modulation format, similar to 8 QAM. FIG. 8*b* represents PRBS data encoded in half of a 16-QAM format, similar for 8 QAM. FIG. 8*a* and FIG. 8*b*, in isolation, may require stabilization to be circularly symmetric. In this embodiment, a combination of FIG. 8*a* and FIG. 8*b* yields FIG. 8*c*, which is circularly symmetric and Pseudo 16 QAM. In certain embodiments, aspects of techniques described herein, such as P-M-QAM, may be used to transmit 3 bits per symbol (SP-16-QAM, similar to 8 QAM) but the constellation of the signal may look like 16 QAM. In other embodiments, the techniques of the current disclosure may be used to encode any spectral efficiency into a higher spectral efficiency with a known bit In many embodiments, the techniques described herein may be performed and/or stored on a computer, a processor, and other types of integrated circuits or specially designed circuits. In some embodiments, the techniques herein may be stored on firmware or computer readable medium such as hard drives, RAM, and memory. In other embodiments, the techniques herein may be part of a generalized computing device or a specialized computing device. In certain embodiments, the current techniques may be used with fiber optic communication. In some embodiments, an encoder may be on a source side of a fiber optic communication system. In certain embodiments, a decoder may be on a receiving side of a fiber optic communication. In many embodiments, a source side of a fiber optic communication system may send a light wave to a receiving side. In certain embodiments, a fiber optic communication system may use one or more of the techniques described herein.

In some embodiments, one or more of the embodiments described herein may be stored on a computer readable medium. In certain embodiments, one or more of the embodiments described herein may be embodied in a computer program product that may enable a processor to execute the embodiments. In many embodiments, one or more of the embodiments described herein may be executed on at least a portion of a processor.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor DSP. In certain embodiments, one or more of the embodiments herein may be executed on a DSP. One or more of the embodiments herein may be programmed into a DSP. In other embodiments, one or more of the techniques herein may be fabricated in a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase “and/or,” as used herein in the specification and in the claims, should be understood to mean “either or both” of the elements so conjoined, i.e., elements that are conjunctively present in some cases and disjunctively present in other cases.

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

The terms "approximately" and "about" may be used to mean within ±20% of a target value in some embodiments, within ±10% of a target value in some embodiments, within ±5% of a target value in some embodiments, or within ±2% of a target value in some embodiments. The terms "approximately" and "about" may include the target value.

What is claimed is:

1. A method comprising:

modifying a higher order modulation format to operate at an efficiency of a lower order modulation format by mapping a first encoding signal order into a second encoding signal order, wherein:

the first encoding signal order uses a first modulation scheme;

the second encoding signal order uses a second modulation scheme; and the first modulation scheme uses fewer constellation points than the second modulation scheme.

2. The method of claim 1 wherein the mapping includes: generating a sequence of one or more known bits; and encoding the generated one or more bits and one or more data bits into the second encoding signal order.

3. The method of claim 1 wherein the first encoding signal order is a BPSK signal and the second encoding signal order is a QPSK signal to make the BPSK signal circularly symmetric.

4. The method of claim 3 wherein the mapping includes adding bits to the BPSK signal corresponding to a known sequence of bits to encode it to a QPSK signal.

5. The method of claim 2 wherein the generating a sequence of know bits is done by one or more pseudo random bit generators.

6. The method of claim 4 further comprises:

decoding the QPSK signal into the BPSK signal using the known sequence of bits.

7. The method of claim 2 further comprising:

using a unique word to synchronize the sequence of known bits.

8. A method for achieving at least two encoding signal orders using a single type of modulation format; by enabling a modification of a higher order modulation format to operate at an efficiency of a lower order modulation format by mapping a first encoding signal order into a second encoding signal order; wherein the first encoding signal order uses a first modulation scheme; wherein the second encoding signal order uses a second modulation scheme; and wherein the first modulation scheme uses fewer constellation points than the second modulation scheme.

9. The method of claim 8 wherein the single modulation enables switching between the at least two encoding signal orders without disrupting a control loop between a modulation module encoding data transmitted using the modulation type and a modulation module decoding the data.

10. The method of claim 9 wherein a first of the at least two encoding signal orders is 16 QAM.

11. The method of claim 10 wherein a second of the at least two encoding signal orders is 8 QAM.

12. The method of claim 11 wherein a third of the at least two encoding signal orders is QPSK.

13. The method of claim 8 wherein the first encoding signal order is M-QAM and wherein the second encoding signal order is N-QAM; further wherein N>M.

14. An apparatus comprising:

logic that enables:

modifying a higher order modulation format to operate at an efficiency of a lower order modulation format by mapping a first encoding signal order into a second encoding signal order, wherein:

the first encoding signal order uses a first modulation scheme;

the second encoding signal order uses a second modulation scheme; and the first modulation scheme uses fewer constellation points than the second modulation scheme.

15. The apparatus of claim 14 wherein the mapping includes:

generating a sequence of one or more known bits; and encoding the generated one or more bits and one or more data bits into the second encoding signal order.

16. The apparatus of claim 14 wherein the first encoding signal order is a BPSK signal and the second encoding signal order is a QPSK signal to make the BPSK signal circularly symmetric.

17. The apparatus of claim 14 wherein the generating a sequence of know bits is done by one or more pseudo random bit generators.

18. The apparatus of claim 14 wherein the logic further comprises:

decoding the QPSK signal into the BPSK signal using the known sequence of bits.

19. The apparatus of claim 15 wherein the logic further comprises:

using a unique word to synchronize the sequence of known bits.

20. The apparatus of claim 16 wherein the mapping includes adding bits to the BPSK signal corresponding to a known sequence of bits to encode it to a QPSK signal.

* * * * *